(12) United States Patent
Coe et al.

(10) Patent No.: US 6,797,405 B1
(45) Date of Patent: Sep. 28, 2004

(54) METHOD FOR UNIFORM ELECTROCHEMICAL REDUCTION OF APERTURES TO MICRON AND SUBMICRON DIMENSIONS USING COMMERCIAL BIPERIODIC METALLIC MESH ARRAYS AND DEVICES DERIVED THEREFROM

(75) Inventors: James V. Coe, Worthington, OH (US); Shaun M. Williams, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 10/426,906

(22) Filed: Apr. 30, 2003

Related U.S. Application Data

(60) Provisional application No. 60/377,170, filed on May 1, 2002.

(51) Int. Cl.[7] .............................. B32B 3/10; C25D 5/02; G02B 1/00
(52) U.S. Cl. ....................... 428/596; 205/122; 205/149; 205/150; 205/182; 205/263; 205/264; 205/266; 205/291; 210/483; 250/216; 359/350; 428/668; 428/669; 428/670; 428/671; 428/672; 428/673; 428/674; 428/675; 428/680; 428/935
(58) Field of Search ................. 428/596, 668, 428/669, 670, 671, 672, 673, 674, 675, 680, 935; 205/122, 149, 150, 182, 263, 264, 266, 291; 210/483; 250/216; 359/350

(56) References Cited

U.S. PATENT DOCUMENTS

| | | | | |
|---|---|---|---|---|
| 4,410,454 A | * | 10/1983 | Faschingbauer | 205/149 |
| 5,973,316 A | | 10/1999 | Ebbesen et al. | 250/216 |
| 6,014,251 A | | 1/2000 | Rosenberg et al. | 359/350 |
| 6,044,981 A | | 4/2000 | Chu et al. | 210/490 |

* cited by examiner

*Primary Examiner*—Robert R. Koehler
(74) *Attorney, Agent, or Firm*—Standley Law Group LLP

(57) ABSTRACT

A method for electrodepositing a uniformly thick coating on a metallic mesh is provided, the method comprises the steps of: (1) providing a metallic mesh having a plurality of apertures having at least one dimension greater than nanometer scale sizes; (2) subjecting the metal mesh to a relatively fast deposition of an electrodeposited material so as to substantially uniformly coat said mesh with electrodeposited material; and (3) subjecting the product of the relatively fast deposition step to a relatively slow deposition of an electrodeposited material so as to reduce at least one dimension greater than nanometer scale size to a size of nanometer scale. Also provided are metallic meshes so prepared and spectral filters.

32 Claims, 12 Drawing Sheets

(a)                  (b)

(a)          (b)

(a) (b)

METHOD FOR UNIFORM ELECTROCHEMICAL REDUCTION OF APERTURES TO MICRON AND SUBMICRON DIMENSIONS USING COMMERCIAL BIPERIODIC METALLIC MESH ARRAYS AND DEVICES DERIVED THEREFROM

The present application claims priority to U.S. provisional application No. 60/377,170, filed May 1, 2002, which is hereby incorporated in its entirety by reference.

TECHNICAL FIELD OF THE INVENTION

The present invention relates to a method for the uniform electrochemical reduction of apertures to micron and submicron dimensions. Further, the present invention relates to spectral filters and methods of making spectral filters for filtering infrared, visible and ultraviolet radiation.

BACKGROUND OF THE INVENTION

Many techniques exist currently for filtering infrared, visible and ultraviolet radiation. Among these are: mono-chromators (grating or prism types), resonators (for example, Fabry-Perot type), multi-layer dielectric thin films on appropriate substrates, films or bulk materials having appropriate dielectric functions, absorbing colored filters, scatter filters, etc. In practice, all of these techniques are adversely affected, to varying degrees, by environmental factors such as heat, humidity, vibrations, etc.

It is therefore a goal of the present invention to construct metallic meshes with ordered arrays of micro-channels and nano-channels, to characterize their unusual optical and electrical properties, and to exploit their unusual properties in order to detect minute quantities of molecules within the micro- and nano-channels.

Practically speaking, it is a goal of the present invention to construct rugged metallic membranes with ordered arrays of micro- and nano-channels from a variety of metals including some (for example gold and silver) with a known potential for surface enhanced Raman spectroscopy and others (such as copper and platinum) with interesting catalytic properties. It is a further goal of the present invention to produce uniform ordered arrays through the membrane over a region of several square millimeters and with aperture widths from 2 to 6000 nanometers. Additionally, the present invention seeks to use electrical and optical detection techniques to know when and how quickly molecules (including bio-molecules) have moved in and out of the nano-channels. Finally, it is a further goal of the present invention to couple the detection methods to analytical techniques for exploring the potential of such techniques on the nano-scale.

The present invention may be utilized in the following applications: in physical separation and filtering, as in inkjet filters; to limit diffusion which may be important in drug delivery or sensor applications; for regulation and switching of ionic flow and molecular transport; as masks for quantum dot arrays; as a matrix for sensor arrays or lipid bi-layer arrays for bio-analysis; as detection elements in chemical separations and assays, such as "nano-capillary" electro-phoresis; in solar selective absorbing surfaces, beam splitters, and optical bandpass filters; and in combinatorial work exploiting the arrays, i.e. put something in each channel. Of course, this list is by no means exhaustive of the potential applications in which the present invention may be employed. Rather, it is meant to be illustrative of the breadth of applications in which the present invention may be used.

SUMMARY OF THE INVENTION

Arrays of micro- and nano-channels represent one of the fundamental building blocks of nano-technology. The metallic meshes described herein are strong and flexible enough to be manipulated by hand or with a pair of tweezers. They can be transported without breaking. They may be pressed onto other membranes. They may also be heated without melting. In spite of being fairly rugged, the mesh contains an array of holes with hole-to-hole spacing on the order of microns and a hole diameter that can be closed down to nano-sizes. These meshes represent our interface to the nano-size regime and provide the scaffolding for nano-tech engineering.

The optical properties of grids and meshes become very interesting when the apertures become smaller than the wavelength of probing light. A single aperture (of a non-transparent material) exhibits diminished transmission as the wavelength of probing light becomes larger than the aperture. However, if the apertures are arranged in an ordered array, then long wavelength light can be passed when the wavelength matches the spacing between holes (due to constructive interference). For instance, we purchased commercial 2000 line/inch electro-formed nickel mesh (Buckbee-Mears brand) with 6.5 micrometer square apertures and hole-to-hole spacing of 12.5 micrometers which leaves nominally 26% of the mesh area as open space. Noting that transmission falls from 17 to 14% through the visible, this mesh actually transmits 77% of light around 700 $cm^{-1}$. Such bandpass phenomena are well known in grating science and are sometimes described as Wood's anomalies. Most of the mesh or grid devices described in the literature work in the far infrared. They are sometimes called "inductive grids" because their very long wavelength transmission properties can be modeled with an equivalent electrical circuit representation (parallel inductor and capacitor in series with a resistor). The advent of nano-technology or nano-dimensions within the meshes essentially involves pushing the far infrared band pass into the visible. If one wants to study molecules inside or on the surface of a nano-channel, then the constructively-interfering light transmitted by the mesh is particularly useful because only light that has had extensive interaction with the channel is transmitted, i.e. all transmitted photons have passed within less than a half wavelength of everything within the channel. Thus, one can use these membranes to select just the photons containing information about the nano-channel's contents.

The unusual mesh properties can be exploited to develop sensitive spectroscopic probes of species within the nano-channels. For instance, a metal micro- or nano-channel could be thought of as an optical cavity. Upon illumination of the channel cavity, one might expect the excitation of transverse modes and surface plasmon resonances. Such effects are well known in grating physics and have been exploited to probe proteins embedded in lipid bi-layers attached to thin metal films. We use mesh systems with surface plasmon resonances matched to a probing laser enabling surface enhanced Raman spectra (SERS) to be recorded for species on the surface of the nano-channel. The coupling of SERS with the unusual bandpass properties of metallic mesh arrays, presents an opportunity for a simple, sensitive, chemically specific, and yet remote means to assay the contents of mesh channels.

A method for electrodepositing a uniformly thick coating on a metallic mesh of the present invention comprises the steps of: (1) immersing a metallic mesh in a bath of electrolyte, the metallic mesh comprising at least one aperture having a shape, the electrolyte having an initial concentration and comprising cations and anions in a solvent; and (2) applying an overvoltage to the metallic mesh while immersed in the bath so as to electrodeposit a uniformly thick coating on the metallic mesh thereby forming an initially coated metallic mesh.

It is preferred that the method additionally comprises the step of subjecting the initially coated metallic mesh to a deposition step so as to electrodeposit an additional coating on the initially coated metallic mesh. In this manner the thickness of the coating may be regulated.

While the metallic mesh may be any metallic mesh having suitable properties for the electrodeposition, it is preferred that the metallic mesh comprises a material selected from the group consisting of nickel and composites thereof.

The apertures may be any regular or irregular shapes; however, it is preferred that the apertures have a shape selected from the group consisting of: squares, circles, triangles, rectangles, and polygons. Further, it is preferred that the shape of the aperture is preserved after the uniformly thick coating is electrodeposited. That is to say, the coated aperture has a substantially similar shape to the uncoated aperture.

The uniformly thick coating may be comprised of any material; however, it is preferred that the uniformly thick coating be comprised of a metal selected from the group consisting of copper, platinum, gold, silver, and composites thereof.

The overvoltage applied across the metallic mesh represents the extra energy needed to force the electrochemical cell to proceed at a required rate. It is preferred that the overvoltage be at least 5 volts. It is more preferred that the overvoltage be at least 10 volts.

The present invention includes metallic mesh coated by the aforementioned methods.

In yet another method for electrodepositing a uniformly thick coating on a metallic mesh of the present invention, the method comprising the steps of: (1) providing a metallic mesh having a plurality of apertures having at least one dimension greater than nanometer scale sizes; (2) subjecting the metal mesh to a relatively fast deposition of an electrodeposited material so as to substantially and uniformly coat the metallic mesh with electrodeposited material; and (3) subjecting the product of the relatively fast deposition step to a relatively slow deposition of an electrodeposited material so as to reduce at least one dimension greater than nanometer scale size to a size of nanometer scale.

While the metallic mesh may be constructed of any material suitable for the electrochemical process, it is preferred that the metallic mesh comprises a material selected from the group consisting of nickel and composites thereof.

The uniformly thick coating may comprise any suitable material, however, it is preferred that the uniformly thick coating comprise a metal selected from the group consisting of copper, platinum, gold, silver, and composites thereof.

The apertures may be any regular or irregular shapes; however, it is preferred that the apertures have a shape selected from the group consisting of: squares, circles, triangles, rectangles, and polygons. Further, it is preferred that the shape of the aperture is preserved after the uniformly thick coating is electrodeposited. That is to say, the coated aperture has a substantially similar shape to the uncoated aperture.

The present invention includes metallic mesh having a uniformly thick coating produced in accordance with the aforementioned method.

The present invention includes a coated metallic mesh comprising: (1) a metallic mesh comprising at least one aperture, each aperture having at least one dimension less than about 10 micrometers; and (2) a coating disposed on the metallic mesh, the coating having a thickness, wherein the coating at least partially filling at least one said aperture.

While the metallic mesh may be constructed of any material suitable for the electrochemical process, it is preferred that the metallic mesh comprises a material selected from the group consisting of nickel, and composites thereof.

The uniformly thick coating may comprise any suitable material, however, it is preferred that the uniformly thick coating comprise a metal selected from the group consisting of copper, platinum, gold, silver, and composites thereof. It is preferred that the coating be at least one nanometer thick.

The apertures may be any regular or irregular shapes: however, it is preferred that the apertures have a shape selected from the group consisting of: squares, circles, triangles, rectangles, and polygons. Further, it is preferred that the shape of the aperture is preserved after the uniformly thick coating is electrodeposited. That is to say, the coated aperture has a substantially similar shape to the uncoated aperture.

The present invention also provides a spectral filter comprising: (1) a metallic mesh comprising an array of at least two substantially uniform parallel apertures, each aperture having a shape; (2) a coating disposed on the metallic mesh, the coating having a substantially uniform thickness, wherein the coating partially fills each aperture such that each coated aperture has at least one dimension not greater than about 100 nanometers.

While the metallic mesh may be constructed of any material suitable for the electrochemical process, it is preferred that the metallic mesh comprises a material selected from the group consisting of nickel and composites thereof.

The uniformly thick coating may comprise any suitable material, however, it is preferred that the uniformly thick coating comprise a metal selected from the group consisting of copper, platinum, gold, silver, and composites thereof. It is preferred that the coating be at least one nanometer thick.

The apertures may be any regular or irregular shapes; however, it is preferred that the apertures have a shape selected from the group consisting of: squares, circles, triangles, rectangles, and polygons. Further, it is preferred that the shape of the aperture is preserved after the uniformly thick coating is electrodeposited. That is to say, the coated aperture has a substantially similar shape to the uncoated aperture.

The spectral filter may be a bandpass filter.

BRIEF DESCRIPTION OF THE DRAWINGS

FIG. 8 additionally shows how the metal mesh is secured to the substrate with strips of tape.

DETAILED DESCRIPTION OF THE PREFERRED EMBODIMENT(S)

We have developed an electrochemical procedure that uniformly reduces the 6.4 micrometer square holes of commercially available nickel (Ni) mesh (Buckbee-Mears, 278 E. 17th St., St. Paul, Minn. 55101) 2000 line/inch electro-formed Ni mesh to micro- and sub-micrometer dimensions by electro-depositing metal (copper in this case).

Figure 1:
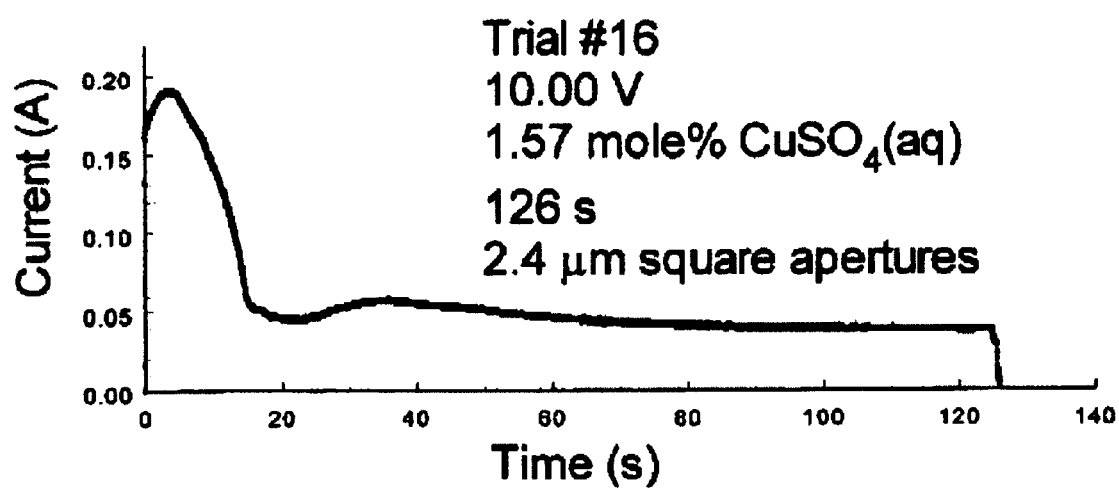
FIG. 1 shows electrochemical current versus time illustrating the initial burst producing uniformity in deposition.
Figure 2:
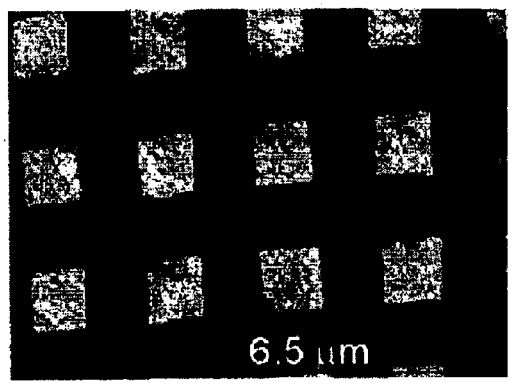
FIG. 2 provides a side by side comparison of transmission mode optical microscope images of Buckbee-Mears 2000 line/inch nickel mesh before (a) and after (b) coating with copper.
Figure 2:
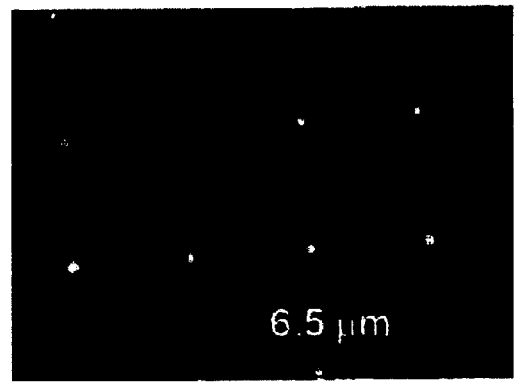
Figure 3:
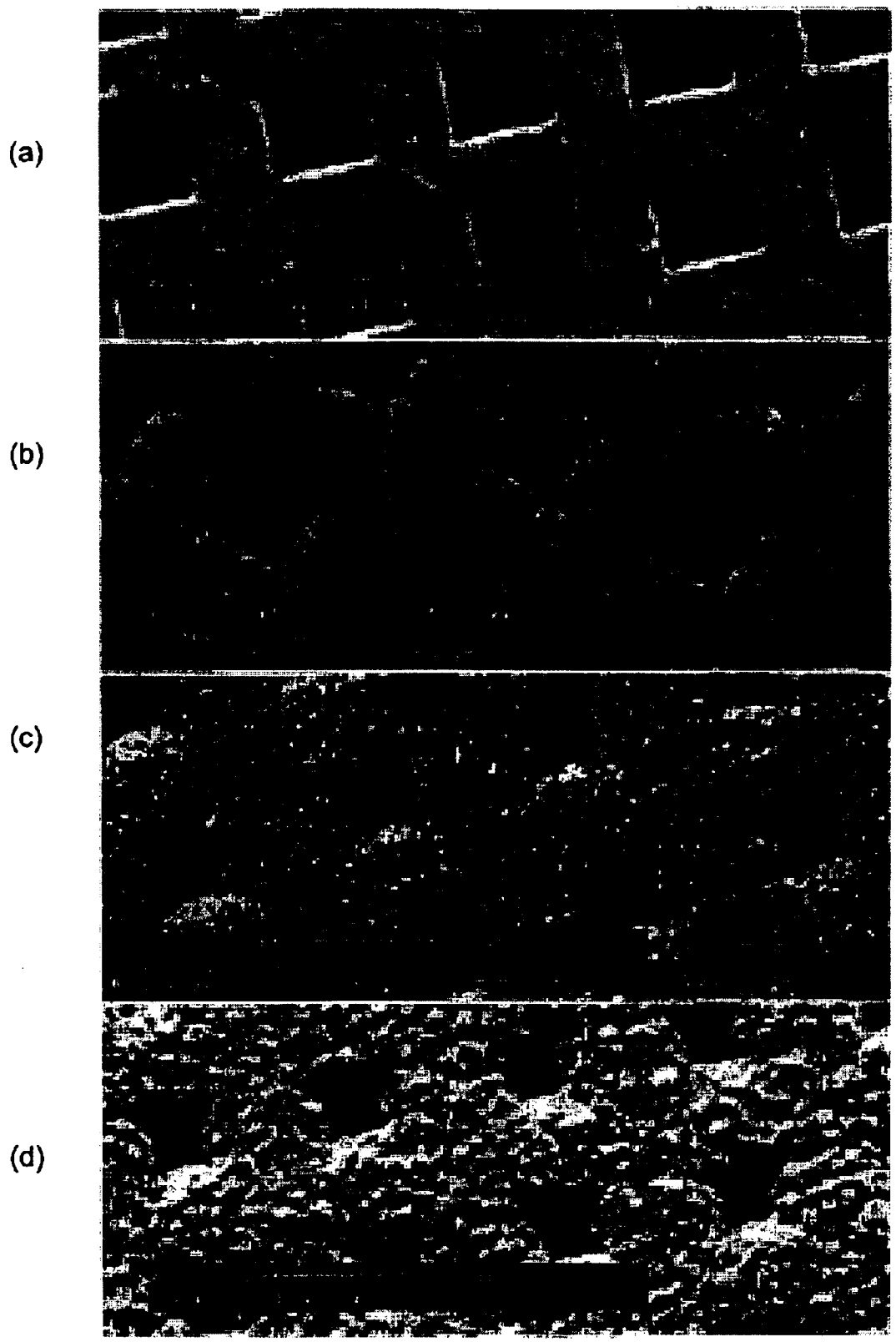
FIG. 3 provides SEM images of grids over the course of the deposition process illustrating how the apertures are reduced. In (a) the undeposited, original nickel mesh having a channel diameter of 6.5 $\mu$m and a channel-to-channel spacing of 12.5 $\mu$m. The second (b) through the fourth (d) images show grids where the copper has been electrodeposited for sequentially longer times producing channel widths of 4.2, 2.7, and 1.4 $\mu$m, respectively.

The key procedural step involves a specific electrochemical over-voltage (10 V) and an initial concentration of $CuSO_4$ solution (1.6 mole %) which produces a high current (~0.2 A) burst of deposition lasting about 10 seconds. As shown in FIG. 1, the high current burst of deposition subsides after 10 to 15 seconds. This is followed by a stage of much lower deposition current (~0.07 A) which is variably extended up to 110 seconds to produce the range of channel widths used in this work. FIG. 2 shows (a) the uncoated nickel mesh with an array of 6.5 μm apertures and (b) the coated mesh. A sequence of grids with their channels closed down to successively smaller widths is shown in FIG. 3. The resulting apertures are remarkably uniform and seem to retain the square cross section of the original apertures. The initial burst of high deposition current quickly lays down metal without regard to the thermodynamic stability of sites. This produces a very uniform initial coating much like the original mesh (see FIG. 3 (b)). The second stage of lower current deposition is likely to be more thermodynamically controlled growth of crystallites (see the much larger copper crystals in (d) of FIG. 3). Channels can be closed to about 1 micrometer with these procedures at which point the growth of micro-crystals becomes comparable to the channel width. The channel diameters have been measured with both an optical microscope and a scanning electron microscope (SEM). The channel widths, % open area, and standard deviation of widths are presented in Table 1 as follows:

| Channel Width[a,b] (μm) | Std. Dev. Width[c] (μm) | Percent Open Area (%) |
|---|---|---|
| 6.53 | 0.16 | 27.3 |
| 4.72 | 0.13 | 14.3 |
| 4.06 | 0.32 | 9.1 |
| 2.66 | 0.13[d] | 4.5 |
| 2.23 | 0.28 | 3.2 |
| 1.11 | 0.16 | 0.8 |

[a]The optical widths were largely in agreement with corresponding SEM widths, i.e. within ~10%, obtained in more limited sampling.
[b]The average of one channel width from a random image within each of 20 areas that the ~3 x 4 mm area of mesh was divided into.
[c]The standard deviation of 20 channel widths from each area of the mesh.
[d]This deviation was taken from optical images of only a small area since this mesh was damaged in a subsequent experiment before images were recorded over the entire mesh's surface.

Figure 4:
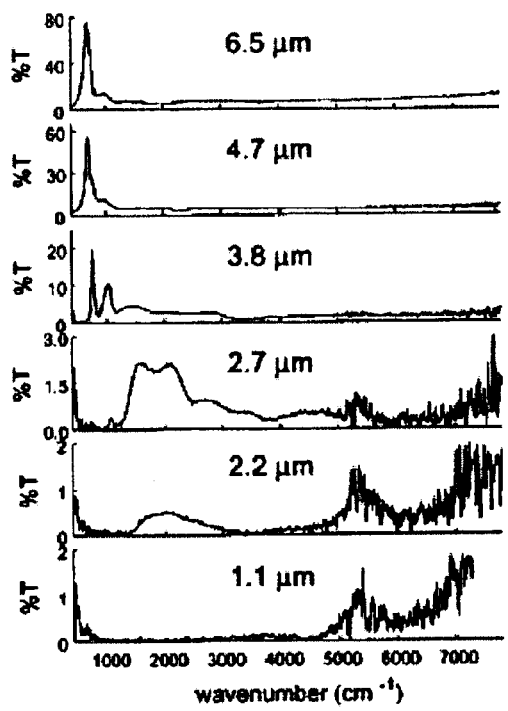
FIG. 4 provides a side-by-side comparison of the IR transmission spectra (a) and UV-vis transmission spectra (b) for a copper grid with 12.5 μm channel-to-channel spacing as the channel width is reduced from 6.5 to 1.1 μm. The top spectrum approaches a transmission in accord with its open area (27%) at the highest photon energies in the vis-uv range. Transmission diminishes at lower photon energies, until a 77% peak transmission band is seen in the IR around 800 $cm^{-1}$ where the photon wavelength is close to matching the 12.5 μm channel-to-channel spacing. The bandpass region changes dramatically as the channel width is reduced.
Figure 4:
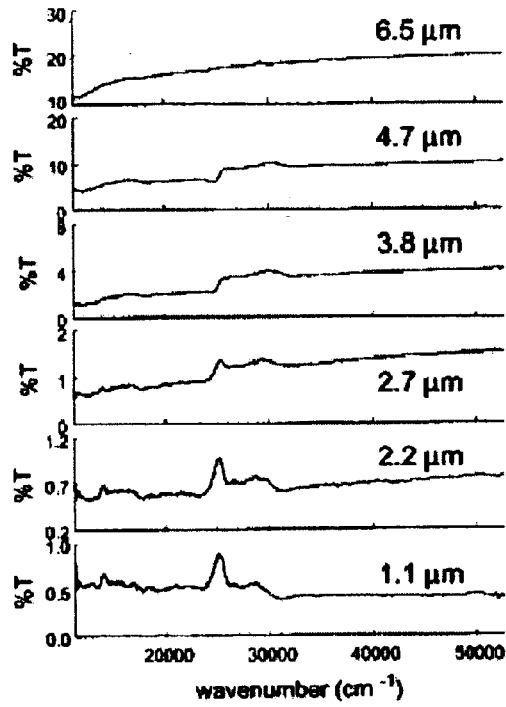
Figure 5:
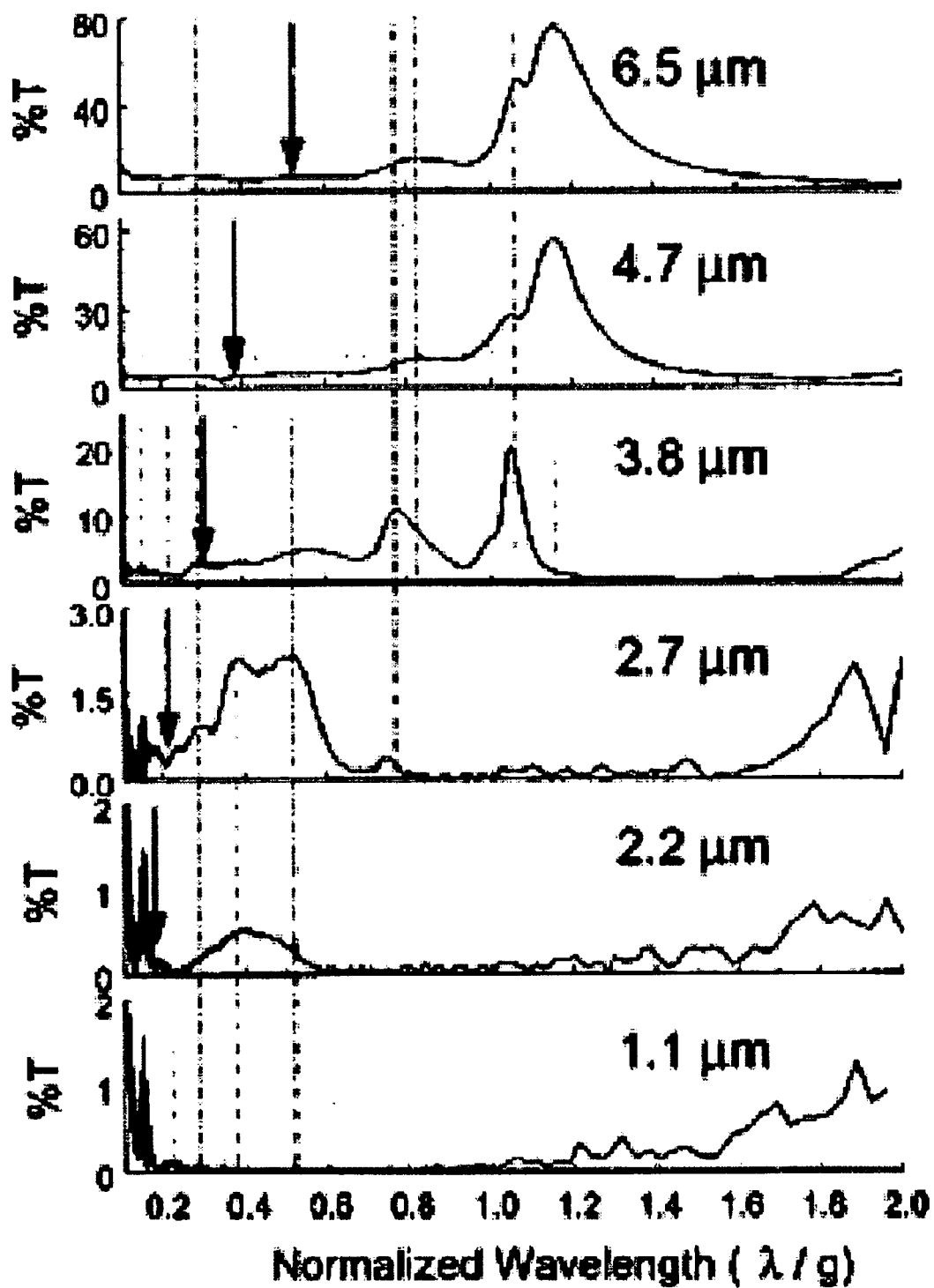
FIG. 5 provides comparison of IR spectra versus normalized wavelength (λ/g where g is the grid constant or channel-to-channel spacing). The maximum transmission bands move from near 1.2 to near 0.4 grid units where g=12.5 μm as channel width changes from 6.5 to 2.2 μm. The downward pointing arrows indicate the channel widths in this normalized coordinate. The bandpass seems to move from the channel-to-channel spacing to the channel width as channel width decreases.

Different channel diameters lead to different transmission bandpass characteristics in the infrared (IR) as can be seen in the transmission spectra of FIG. 4. The IR transmission spectra have also been presented in wavelength normalized to the grid parameter g, i.e. the channel-to-channel spacing, in FIG. 5. As the channel width closes down, the bandpass region moves from wavelengths near the grid constant (1.0 in FIG. 5) to smaller wavelengths approaching the channel width (indicated as a downward arrow in FIG. 5). The appearance of the transmission peaks at a normalized value of about 1.2 has been observed previously by Huggard and coworkers and by Sakai and Yoshida. They found that the transmission peak at 1.2 was caused by the arrangement of the channels. Presumably, the peak is not exactly at 1.0 because a two dimensional square geometry is involved, rather than a one-dimensional spacing of slits. The dotted vertical lines show that maxima at certain wavelengths rise and fall through the course of the channel width sequence suggesting interference effects. The favored modes change with channel width. As the channels close down, the channel-channel interfering interactions are reduced and the optical properties of the individual channel must become more important. There is much work on the reflection characteristics of one-dimensional periodic gratings; however, there is much less work on bi-periodic gratings, and even less on bi-periodic transmission gratings. There are a few papers with theory that can predict these spectra for which we note that the effect of thickness is largely unknown at this point (our meshes are 3 micro-meters thick plus the deposit which may be a few micro-meters). It would be very interesting to model these transmission spectra in order to associate geometrical features with characteristics in the IR transmission spectra.

The UV-vis spectra also show interesting behavior (see column (a) in FIG. 4) even though the wavelengths are all shorter than the channel widths. The original mesh (6.5 $\mu$m, see top of column (a) in FIG. 4) shows a monotonically increasing transmission of ~21% at the shortest wavelength approaching the 27% open area of the mesh. This could be described as the "particle limit", i.e. the transmission expected from a flux of ideal, infinitely small, noninteracting particles. For all but the smallest channel width, there is an expected reduction in transmission with increasing wavelength through the visible. On top of this trend approaching "ideal particle" behavior, there appear to be interference effects in the form of a stepped pattern (particularly prominent in the UV-vis spectra of the 4.7, 3.8, and 2.7 $\mu$m channel width grids). We presume that this pattern arises from the square geometry and spacing of the channels, because the stepped pattern changes at the same wavelengths in each spectrum. It will depend on the grid constant, which is not changed in this experiment. Finally, at the most reduced aperture sizes, there is a reversal of the general trend (less transmission at shorter wavelengths) and currently unexplained peaks at the changes in the interference pattern.

Figure 6:
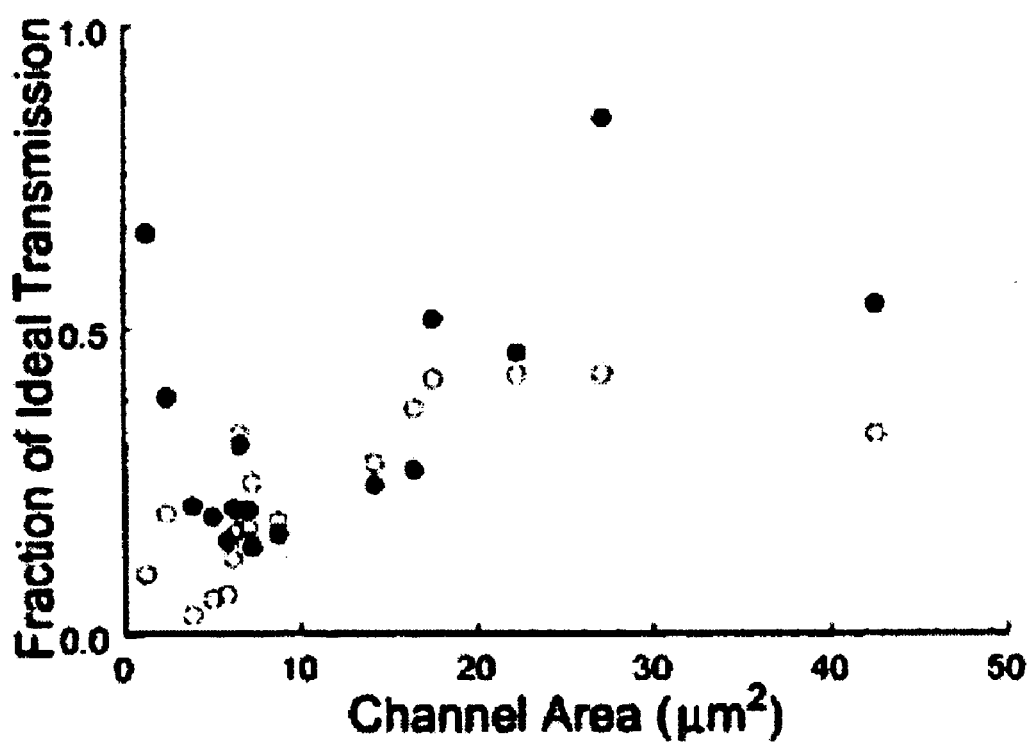
FIG. 6 illustrates the fraction of ideal particle transmission in the IR (open symbols) and uv-vis (closed symbols) ranges versus the channel area. Spectra in the IR and uv-vis were integrated and normalized to the integral of the % open area over the same spectral range and step size. Most of the grids fall into a range where there is a linearly decreasing fraction of ideal transmission with decreasing channel area. The visible data approach the ideal limit at large channel areas quicker than the IR data due to the shorter wavelength of visible light.

It is interesting to compare the transmission of IR and UV-vis light through the mesh with the transmission of ideal particles. The IR spectra of FIG. 4 (column (a)) and others at different channel widths were integrated from 400 to 4800 cm$^{-1}$ and normalized to the integral of the ideal particle transmission (column 2 of Table 1) to obtain the fraction of transmission for IR photons relative to the ideal case (see the open symbols in FIG. 6). The UV-vis spectra were integrated from 10,000–52,630 cm$^{-1}$ and similarly normalized (see the closed symbols in FIG. 6). The fraction of transmission relative to ideal, infinitely small, non-interacting particles is plotted against the channel areas in FIG. 6. Not only does transmission fall as channel width decreases, but also it falls relative to the ideal transmission. Reduced channel width effectively isolates photons having non-ideal interactions with the channel surfaces, i.e. grids with $\mu$m-sized apertures serve as filters which only transmit photons that have had extensive interactions with the channel surface. In fact, we have seen the IR absorption spectra of methoxy radical adsorbed on the surface of the copper channels in the IR band of light transmitted by several of our grids upon dipping in methanol. Clearly, the self-filtering nature of these grids has great potential for Raman spectroscopic probing of molecules on the surface of the channels.

A procedure for making an electrochemical cell is given below. This cell has been designed so that it is small enough to be able to be used under a microscope. This requirement means the cell needs to be small and have the deposition surface in a position that allows it to be illuminated and observed.

Figure 7:
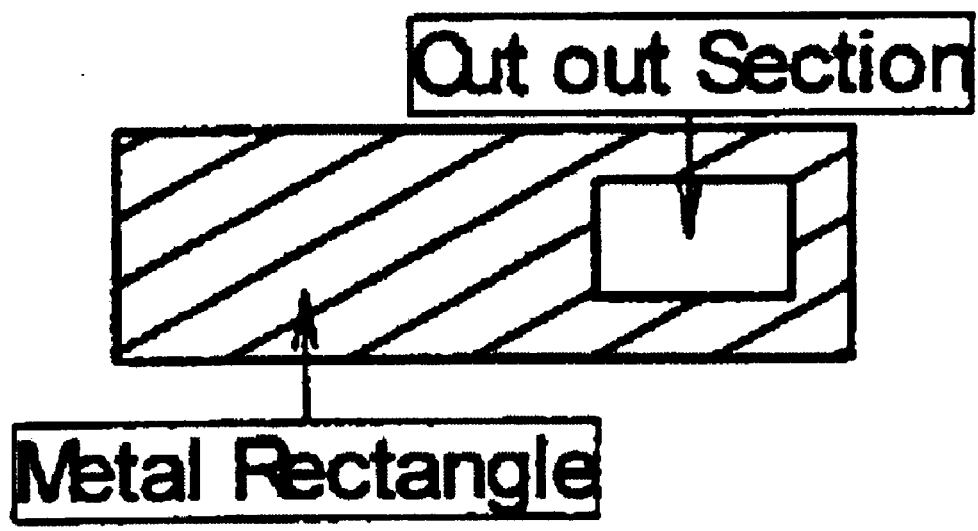
FIG. 7 depicts the thin metal substrate used in the construction of the experimental device.

The first step in building the deposition apparatus is to mount the mesh, onto which copper will be deposited, on a substrate that allows for easy handling and will make an electrical contact with the mesh. A thin solid metal sheet (~0.005"thick) is used. First a rectangle ~0.5 inch by ~1.5 inches is cut from the sheet. Near one end of the rectangle a smaller rectangle is cut out. This rectangle is ~0.4 inch long by ~0.25 inch wide (See FIG. 7). The width of this rectangle determines how much of the mesh will be exposed to the electrolyte solution and therefore how wide of a section of mesh will end coated with copper.

Figure 8:
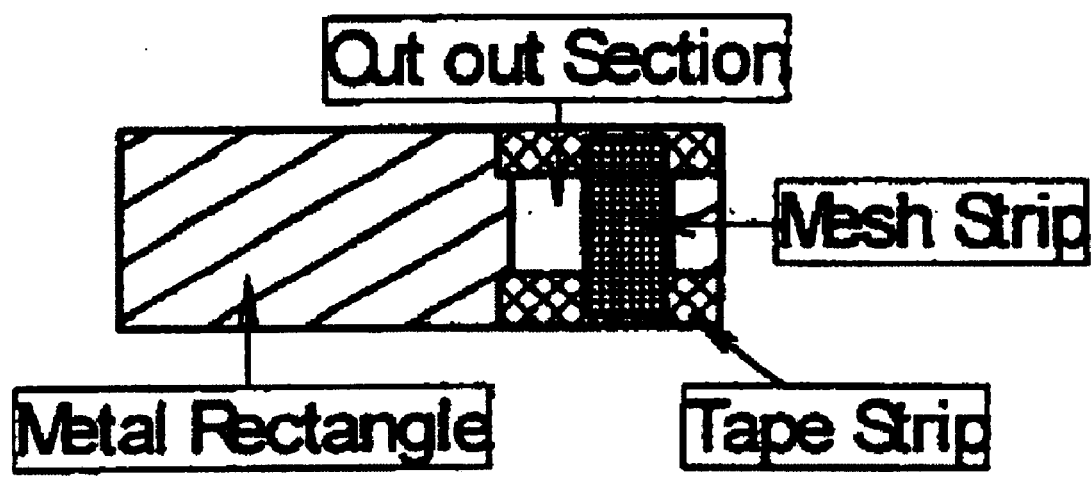
FIG. 8 depicts the positioning of the metal mesh relative to the cut-out section on the substrate.

A small strip of metal mesh is then cut. The mesh should be longer than the cut out section is wide so that there will be good contact between the mesh and the metal sheet. The mesh is manufactured by Buckbee-Mears. It is a nickel mesh that has holes that are reported by Buckbee-Mears as being 0.00030 inches by 0.00030 inches square (part #MN-47). The strip of mesh should have a width that is less than half as long as the cut-out section. This strip is then laid across the cut out section. The mesh is then firmly taped to the metal sheet making sure that the tape does not cover any of the cut-out sections (FIG. 8).

Once this electrode has been made, it is taped to one side of a Kimball Physics plate that has a 0.312 inch hole in the center of it (Kimball Physics part # SS-PL-B5x5-R312). The electrode needs to be lined up with the plate in such a way that all the exposed mesh is inside the hole and most of the open area is also over the hole. The electrode is taped down so the side of the electrode with the mesh is up (not toward the plate).

A different Kimball Physics plate that has no hole in the center (Kimball Physics part # SS-PL-B5x5-B) is prepared by covering the center of one side of the plate with tape so that it is insulated from electrolyte solution that will contact it. This tape cannot cover the holes around the side of the plate since these holes will be used to hold the cell together for the deposition. Using this type of plate will allow for only darkfield viewing (illumination from the top) of the mesh during the deposition process. In order for lightfield viewing or both darkfield and lightfield viewing to be used an alternative plate needs to be used. Instead of using the solid plate, the same type of plate that has the mesh electrode attached to it is used (Kimball Physics part # SS-PL-B5x5-R312). A microscope cover slip is then placed over the center of the hole in the plate. This cover slip is then glued down to the plate. The glue needs to be placed all the way around the cover slip so that a good seal is made (no solution can be allowed to leak out of the cell when it is later assembled). This plate can then be used in place of the solid plate.

To make the counter electrode, a 5-inch length of uncoated copper wire is wrapped once around a pencil. Using a hammer and a solid surface, the copper loop is smashed flat along with about 1 inch of the copper wire leading up to it.

Figure 9:
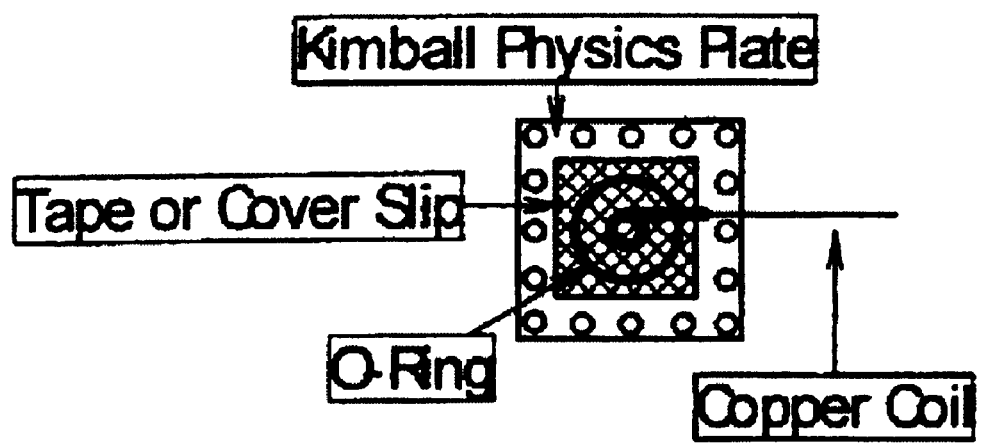
FIG. 9 depicts an intermediate step in the construction of the experimental apparatus.

Assembly of the deposition cell begins with laying the solid Kimball Physics plate on a table with the taped side facing up. If the alternative plate (with the microscope cover slip glued to it) is going to be used, it needs to be placed on the table with the side of the plate with the cover slip glued to it facing up. Four screws that easily fit the cell and are insulated with Teflon tape over half their length to insulate them from both plates are slid through the holes from the bottom up so that the plate is lying on the table tape up with the four screws sticking up. The copper coil is then laid on this so that the coil is in the center of the tape (in the center of the plate). A rubber o-ring with a diameter that is larger than the center hole in the other Kimball Physics plate is placed on top of the coil and the tape plate so that it is centered roughly over the center of the plate (FIG. 9).

Figure 10:
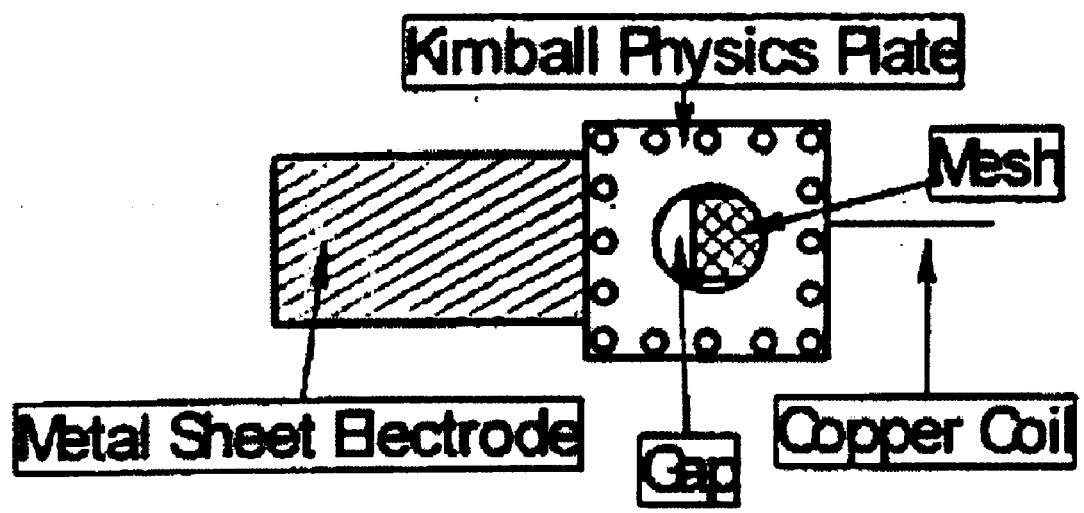
FIG. 10 depicts the completed experimental apparatus used with the present invention.

An o-ring with a diameter that is slightly greater than that of the screw is slid onto each of the screw to keep the plates from coming into contact with each other when they are compressed. The plate that is holding the mesh is lowered over the screws such that part of the electrolyte that overhangs the plate is on the opposite side of the cell from the copper wire. Small sections (~⅛ inch long) of plastic tubing that fit tightly over the screws are pushed onto the screws and the bolts for the screws are then threaded onto each of the screws. The bolts and screws are then tightened to compress the plates together as much as possible without allowing the plates to touch. The cell is now ready for use (see FIG. 10).

Copper sulfate ($CuSO_4$) solution, concentrations between 1% by mole and 3% by mole, is pipetted into the inside of the cell through the remaining cut out section in the top metal sheet. The cell is filled so that the solution covers the top of the mesh with a thin layer of the solution. The metal sheet is then connected to the negative terminal of a low voltage DC power supply and the copper coil is connected to the positive terminal of the power supply. Pre-set the voltage on the power supply to between 1 and 12 volts. After all this is done turn on the power supply to perform the deposition of copper onto the nickel mesh.

Once the deposition has taken place for the desired amount of time, turn off the power supply and disconnect the electrodes from the power supply. Remove the copper sulfate solution from the cell with a pipette and dispose of it. Carefully fill the cell with distilled water and drain that off with a pipette 5 times to remove any remaining copper sulfate solution from the cell and remove any small particles of copper that have flaked off the copper counter electrode during the deposition and washing process. Once the cell is clean, disassemble the cell and wash the part with distilled water. Carefully pull the metal sheet electrode (with the mesh) off the plate that it was taped to and thoroughly, but carefully, wash it with distilled water. Keep the metal sheet electrode so that it can be handled readily without damaging the delicate mesh.

Figure 11:
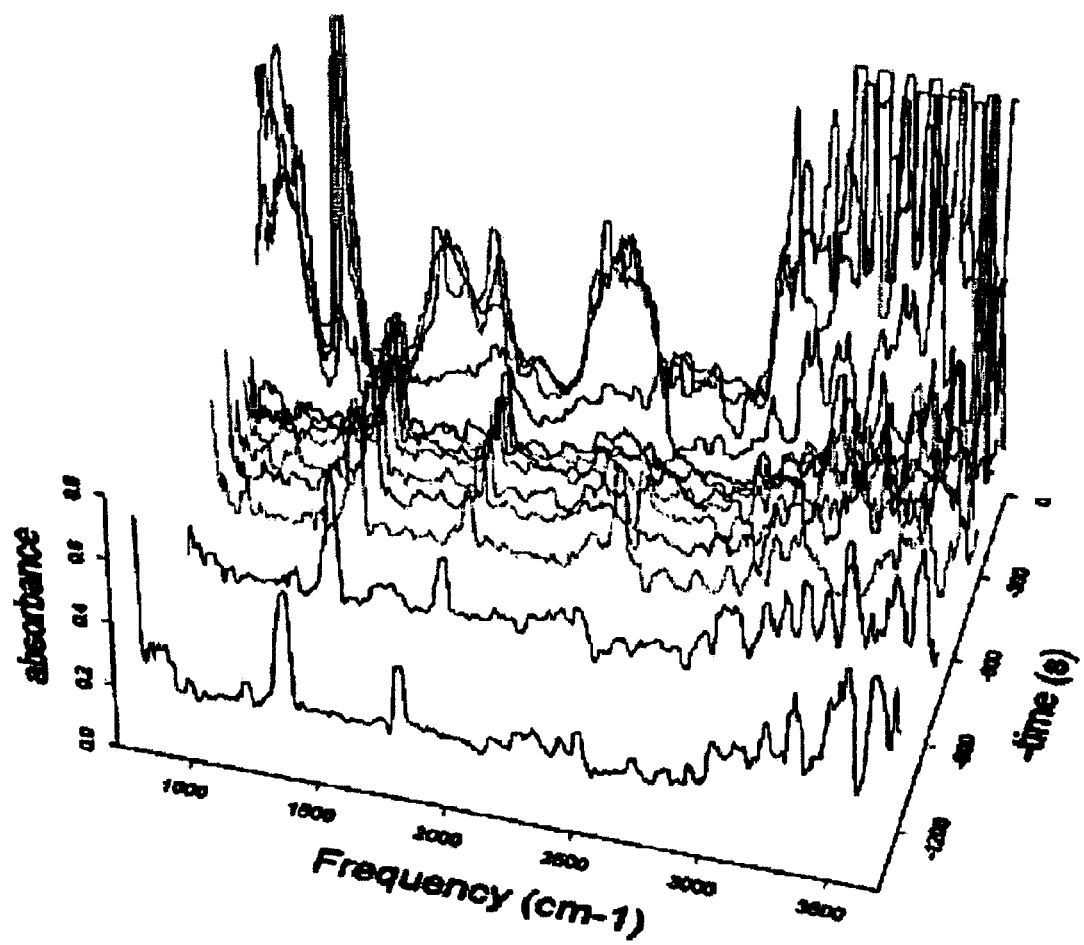
FIG. 11 shows a plot of infrared (IR) absorption spectra versus time after filling 2.7 μm copper micro-channels with liquid methanol. The liquid evaporates in about 20 seconds. The spectra get noisy at the low and high frequency extremes because there is little transmitted light in these regions. The spectra show the transformation of absorbed methanol to adsorbed methoxy radical with subsequent transformation to adsorbed formaldehyde and then formate—all at room temperature. Copper is a well-known industrial catalyst for such transformations.

INFRARED ABSORPTION SPECTRA OF MOLECULES ADSORBED ON The NANOCHANNEL SURFACE—Our first spectroscopic experiments on detecting species within the micro-channels involved the use of the 2.7 μm mesh. We applied a drop of methanol to the mesh and recorded a sequence of infrared spectra over the course of an hour. We were surprised to witness the catalytic transformation of methanol to formate. The mesh had to be previously exposed to water in order to show catalytic activity on these timescales at room temperature. This probably creates reactive oxygen sites on the surface. It was noted that exposure to methanol or water (or just sitting in air for a few days which was similar to water exposure) washed away different regions of the spectrum, so the background was taken as the maximum transmission at a particular wavelength from any spectra taken during or before the sequence. Each spectrum shown in FIG. 11 is a ratio of the spectrum at a particular time to the background composite recorded by averaging for 30 seconds at 16 $cm^{-1}$ resolution. The liquid methanol seemed to evaporate in about 20 seconds as judged by the blurring of HeNe laser diffraction spots. The first spectra recorded after exposure to methanol looks nothing like liquid methanol and shows a prominent transition at 1032 $cm^{-1}$ which can be assigned to methoxy radical adsorbed on the copper surface by the reflection absorption infrared spectra of Trenary and coworkers. There are also less intense transitions in the C—H stretch region that can be compared to work by Peremans, Masseri, Darville, and Gilles. The absorbed methoxy goes away in about two minutes and a set of intermediates appear (which we think includes adsorbed formaldehyde). One can see the evolution of $CO_2$ at about 8 minutes and the growth of peaks at 1288 and 1736 $cm^{-1}$, which we currently assign to adsorbed formate. The adsorbed formate goes away on the time scale of an hour (in this case). Clearly a complicated story of catalysis of methanol by copper is playing out at room temperature. Copper is a well known industrial catalyst for preparing formaldehyde from methanol, and there is a great deal of work characterizing the catalytic transformation of methanol to formaldehyde and other species like formic acid and methyl formate on copper. This work supports the notion that upon adsorption of methanol on the copper surface, the methanol gives up a proton to the surface producing adsorbed methoxy radical. A number of fates are available to the methoxy depending on temperature, concentration, and other adsorbed species.

The most striking thing about these results is the ease with which they were obtained. We dipped a mesh in methanol, placed it in the department's simple FTIR spectrometer, and observed the spectrum of methoxy radical adsorbed on a copper surface. Usually, much more elaborate experimental configurations are required to observe the spectra of radicals on surfaces. This configuration is unusual because every transmitted photon has passed within a half-wavelength of everything within the channel.

Figure 12:
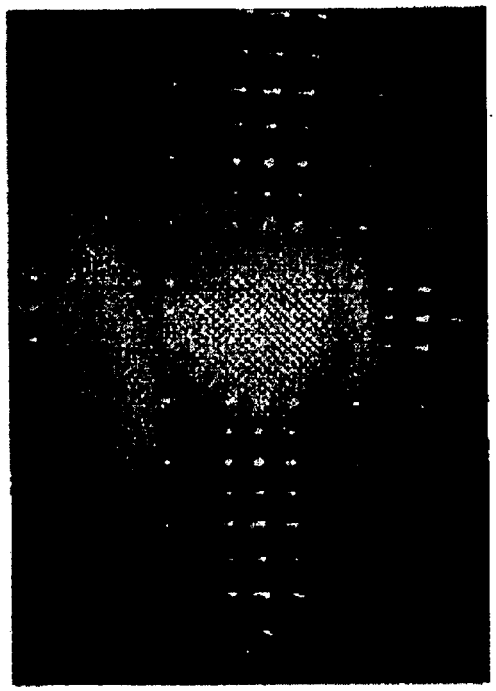
FIG. 12 provides diffraction patterns of HeNe laser on the original Buckbee-Mears mesh (a) and mesh that has been closed down to 2.3 μm (b).
Figure 12:
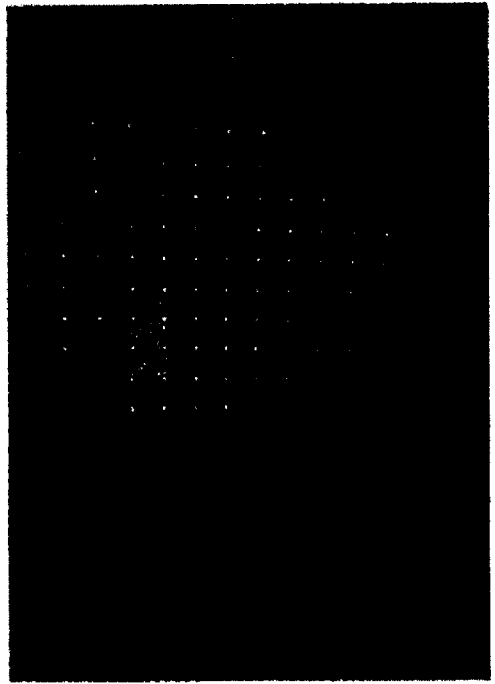

DIFFRACTION OF MESHES WITH REDUCED CHANNEL WIDTH—The ordered arrays in our meshes present beautiful diffraction patterns when illuminated by a HeNe laser. We placed a piece of graph paper about 16 cm beyond the mesh and photographed the pattern of spots produced by the original commercial mesh and mesh that had been closed down to 2.3 μm as shown in FIG. 12. The patterns extend beyond the 30° in scattering angle. The original mesh shows some interesting alternations and patterning which is attributable to the square cross section of the apertures. Upon deposition we see a more evenly diminishing pattern. These observations suggest that it may be useful to study light scattered at high angles to emphasize channel contents in Raman or absorption.

DEVELOPING APPLICATIONS—Given channels coated with gold (Au) or silver (Ag), there exist recipes for attaching bi-lipid membranes to gold and silver films. Commercial instruments are available (from, for example, Aviv instruments) which use SERS to probe proteins embedded in such membranes with great sensitivity. The coating of micro- and nano-channels with lipid bi-layers would allow the mesh to serve as a matrix for biological assemblies and consequently biological analyses. SERS would serve as a remote and chemically selective way to assay the binding of biological molecules to the bi-layer embedded proteins.

It is also possible, with the aid of a microscope and microscale manipulators, to attach separate meshes in registry (aligned with each other in a desired manner). We have overlaid two pieces of commercial mesh under the microscope and successfully clamped them together once oriented as desired. So far, we have produced an ordered array of 1.0 by 6.5 μm apertures with this approach, i.e. an asymmetric biperiodic mesh. It has different infrared transmission properties than the original mesh. One can imagine coating one of the meshes with an insulator, so that a capacitor is formed when the two metallic meshes are pressed together in registry. It will be very interesting to see if the electrical properties can be used to detect properties of molecules within the channels. It turns out that the low frequency transmission of grids is modeled by simple inductor/capacitor/resistor circuits, so it might be useful to combine the electrical and optical measurements, particularly when the subject molecules are ions in solution.

One of the most useful analytical separations is capillary electrophoresis. In one type of such experiments, an electro-osmotic flow is maintained in a micro-sized capillary tube filled with ionic buffer solution by placing a potential of tens of kilovolts across the tube. There must be some means to introduce a pulse of material to be analyzed into the tube. Different species have different mobilities which couple with the electro-osmotic flow to produce different times to travel through the tube to a detector (often a beam of UV light not absorbed by the buffer). We would like to configure a series of meshes, perhaps with a central mesh of greater thickness than the current ones, such that electrophoretic principles could be used to detect the flow of solvated ions through the channels. Perhaps SERS could be used on the terminal mesh as the system detector. We don't expect such small capillaries to do a better job (to have higher resolution) than current analytical configurations, rather we are looking for ways to know what is in the micro- or nano-channel. We might expect to obtain analysis on much shorter time scales ($\mu$-second to milli-second times for crossing these membranes) than traditional electrophoresis allowing faster processing. Such methods might be useful for analyzing large numbers of samples as will be increasingly required in the future for things like DNA analysis.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

What is claimed is:

1. A method for electrodepositing a uniformly thick coating on a metallic mesh, said method comprising the steps of:
   providing a metallic mesh, said metallic mesh comprising at least one aperture having a shape, wherein each said aperture has at least one dimension less than about 10 micrometers;
   immersing said metallic mesh in a bath of electrolyte, said electrolyte having an initial concentration and comprising cations and anions in a solvent; and
   applying an overvoltage to said metallic mesh while immersed in said bath so as to electrodeposit a uniformly thick coating on said metallic mesh thereby forming an initially coated metallic mesh, wherein said initially coated metallic mesh has at least one aperture having at least one dimension less than about 10 micrometers.

2. The method according to claim 1 additionally comprising the step of subjecting said initially coated metallic mesh to a deposition step so as to electrodeposit additional coating on said initially coated metallic mesh.

3. The method according to claim 1 wherein said metallic mesh comprises a material selected from the group consisting of nickel and composites thereof.

4. The method according to claim 1 wherein a said aperture has a shape selected from the group consisting of: squares, circles, triangles, rectangles, and polygons.

5. The method according to claim 1 wherein said uniformly thick coating comprises a metal selected from the group consisting of copper, platinum, gold, silver, and composites thereof.

6. The method according to claim 1 wherein said overvoltage is at least 5 volts.

7. The method according to claim 1 wherein said shape of each said aperture is preserved after said uniformly thick coating is electrodeposited.

8. A metallic mesh having a uniformly thick coating produced in accordance with the method of claim 1.

9. A metallic mesh having a uniformly thick coating produced in accordance with the method of claim 2.

10. A method for electrodepositing a uniformly thick coating on a metallic mesh, said method comprising the steps of:
    providing a metallic mesh having a plurality of apertures having at least one dimension greater than nanometer scale sizes;
    subjecting said metal mesh to a first deposition of an electrodeposited material so as to substantially uniformly coat said mesh with electrodeposited material; and
    subjecting the product of the first deposition step to a second deposition of an electrodeposited material so as to reduce said at least one dimension greater than nanometer scale size to a size of nanometer scale, wherein said first deposition is conducted at a faster rate than said second deposition.

11. The method according to claim 10 wherein said metallic mesh comprises a material selected from the group consisting of nickel and composites thereof.

12. The method according to claim 10 wherein said uniformly thick coating comprises a metal selected from the group consisting of copper, platinum, gold, silver, and composites thereof.

13. The method according to claim 10 wherein said shape of each said aperture is preserved after said uniformly thick coating is electrodeposited.

14. A metallic mesh having a uniformly thick coating produced in accordance with the method of claim 10.

15. A coated metallic mesh comprising:
    a metallic mesh comprising at least one aperture, each said aperture having at least one dimension less than about 10 micrometers; and
    a coating disposed on said metallic mesh, said coating having a thickness, said coating at least partially filling at least one said aperture thereby producing a coated aperture, said coated aperture having at least one dimension less than about 10 micrometers.

16. The coated metallic mesh of claim 15 wherein said metallic mesh comprises a material selected from the group consisting of nickel and composites thereof.

17. The coated metallic mesh of claim 15 wherein said coating comprises a material selected from the group consisting of copper, gold, platinum, silver, and composites thereof.

18. The coated metallic mesh of claim 15 wherein said coating is at least 1 nanometer thick.

19. A coated metallic mesh array comprising at least two coated metallic meshes as in claim 15.

20. A spectral filter, said spectral fitter comprising:
    a metallic mesh comprising an array of at least two substantially uniform parallel apertures, each said aperture having a shape;
    a coating disposed on said metallic mesh, said coating having a substantially uniform thickness, wherein said coating partially fills each said aperture such that each coated aperture has no dimension greater than about 100 nanometers.

21. The spectral filter of claim 20 wherein said metallic mesh comprises a material selected from the group consisting of: nickel and composites thereof.

22. The spectral filter of claim 20 wherein said coating comprises a material selected from the group consisting of: copper, platinum, gold, silver, and composites thereof.

23. The spectral filter of claim 20 wherein said coating is at least 1 nanometer thick.

24. The spectral filter of claim 20, wherein the filter is a bandpass filter.

25. The spectral filter of claim 20, wherein said shape of each said aperture is selected from the group consisting of; squares, triangles, rectangles, circles, and polygons.

26. A method for electrodepositing a uniformly thick coating on a metallic mesh, said method comprising the steps of:

immersing a metallic mesh in a bath of electrolyte, said metallic mesh comprising at least one aperture having a shape, said electrolyte having an initial concentration and comprising cations and anions in a solvent; and applying an overvoltage of at least about 5 volts to said metallic mesh while immersed in said bath so as to electrodeposit a uniformly thick coating on said metallic mesh thereby forming an initially coated metallic mesh.

27. The method according to claim 26 additionally comprising the step of subjecting said initially coated metallic mesh to a deposition step so as to electrodeposit additional coating on said initially coated metallic mesh.

28. The method according to claim 26 wherein said metallic mesh comprises a material selected from the group consisting of nickel and composites thereof.

29. The method according to claim 26 wherein a said aperture has a shape selected from the group consisting of squares, circles, triangles, rectangles, and polygons.

30. The method according to claim 26 wherein said uniformly thick coating comprises a metal selected from the group consisting of copper, platinum, gold, silver, and composites thereof.

31. The method according to claim 26 wherein said shape of each said aperture is preserved after said thick coating is electrodeposited.

32. A metallic mesh having a uniformly thick coating produced in accordance with the method of claim 26.

* * * * *

UNITED STATES PATENT AND TRADEMARK OFFICE
CERTIFICATE OF CORRECTION

PATENT NO. : 6,797,405 B1
DATED : September 28, 2004
INVENTOR(S) : Coe et al.

It is certified that error appears in the above-identified patent and that said Letters Patent is hereby corrected as shown below:

Column 12,
Line 53, please delete "fitter" and insert -- filter --.

Signed and Sealed this

Eighteenth Day of January, 2005

JON W. DUDAS
*Director of the United States Patent and Trademark Office*